United States Patent [19]
Davidson et al.

[11] Patent Number: 5,319,570
[45] Date of Patent: Jun. 7, 1994

[54] CONTROL OF LARGE SCALE TOPOGRAPHY ON SILICON WAFERS

[75] Inventors: Joanne M. Davidson, Poughkeepsie; George Hrebin, Jr., Verbank; Robert K. Lewis, Wappingers Falls; Carl H. Orner, Newburgh, all of N.Y.

[73] Assignee: International Business Machines Corporation, Armonk, N.Y.

[21] Appl. No.: 774,084

[22] Filed: Oct. 9, 1991

[51] Int. Cl.$^5$ .......................................... G06F 15/72
[52] U.S. Cl. ................................... 364/488; 364/507
[58] Field of Search ............... 364/488, 490, 507, 559, 364/562, 489

[56] References Cited

U.S. PATENT DOCUMENTS

| | | | |
|---|---|---|---|
| 3,729,966 | 5/1973 | Khoury et al. | 72/8 |
| 3,751,647 | 8/1973 | Maeder et al. | 235/151.11 |
| 4,272,196 | 6/1981 | Indebetouw | 356/371 |
| 4,334,282 | 6/1982 | Whitehouse | 364/728 |
| 4,422,764 | 12/1983 | Eastman | 356/357 |
| 4,962,461 | 10/1990 | Meyer et al. | 364/482 |
| 5,067,101 | 11/1991 | Kunikiyo et al. | 364/578 |
| 5,070,469 | 12/1991 | Kunikiyo et al. | 364/578 |

OTHER PUBLICATIONS

Automated Visual Inspection Techniques and Applications: A Bibliography, Roland Chin, Pattern Recognition vol. 15, No. 4, pp. 343-357, 1982.

*Primary Examiner*—Thomas G. Black
*Assistant Examiner*—Susan Wieland
*Attorney, Agent, or Firm*—Whitham & Marhoefer

[57] ABSTRACT

A method for the characterization of large scale wafer topography is applied to improving yields in the manufacture large scale integrated (LSI) devices. First, the heights at the center, the edge and an intermediate point are measured on eight equally spaced radii. This provides eight values each for $Y_s$ and $Y_e$ which are averaged. Then the shape angle $\alpha$ is computed using the following equation:

$$\alpha = \tan^{-1}\left(\frac{Y_{eavg}}{Y_{savg}}\right). \quad (24)$$

The shape magnitude M is also computed using the following equation:

$$M = \sqrt{Y_e^2 + Y_s^2} \ . \quad (25)$$

The thus computed values of $\alpha$ and M are correlated with individual wafer characteristics as to device performance and yield. Based on these results, the wafer processing is controlled to provide optimal wafer yield and isolation characteristics.

6 Claims, 12 Drawing Sheets

FIG. 1

P-WAFERS
SCREEN OXIDATION
ION IMPLANT SUBCOLLECTOR
ANNEAL
OXIDATION
OXIDE ETCH
EPITAXY
OXIDATION
CVD NITRIDE

← MAP TOGRAPHY

POR          EXP

HUANG CLEAN
APPLY P/R
BRAKE
RIE BACK SIDE
PLASMA STRIP

← MAP TOPOGRAPHY

SULFURIC/NITRIC CLEAN
HUANG CLEAN
CVD TRENCH MASK OXIDE
OXIDE ANNEAL
.
.
.

FIG.2

Scale 1:00 μm / contour
Warp  13.6 μm
Bow    3.6 μm

CONTROL OF LARGE SCALE TOPOGRAPHY ON SILICON WAFERS

BACKGROUND OF THE INVENTION

1. Field of the Invention

The present invention generally relates to the manufacture of integrated circuits in silicon wafers and, more particularly, to the correlation of the large scale topography of a semiconductor wafer to the characteristics of devices subsequently formed on the wafer. Where significant correlations are found, the large scale topography of subsequent wafers are modified to optimize device characteristics and yield.

2. Description of the Prior Art

In the manufacture of large scale integrated (LSI) circuits, there are various factors which contribute to increased circuit density. Among these are reductions in feature size and an increase in device and circuit complexity. The greater circuit densities are being achieved with the use of several types of transistors on a single chip, allowing for greater design flexibility. The varying transistor types as well as their closer proximity require improvements in device isolation. Current technology, however, does not explain isolation and device junction leakage related failures in some device structures. It is important to address this problem since it is an important factor in both increased circuit density and product yield.

SUMMARY OF THE INVENTION

A study was made by the inventors to determine the effects of large scale surface topography (LST) which exist on product wafers prior to defining the isolation structures on leakage limited yields (LLY). Specific topographic configurations were characterized using a shape factor defined by the angle and magnitude of the bending pattern for each wafer. This shape factor was used to correlate LST with LLY. The results of the study showed that specific unfavorable LST configurations contribute to low test yields at trench maze, post Pt and K metal as well as final test yields. From these results, the inventors have concluded that these lower yields can be attributed to the stress induced defects which arise from unfavorable LST configurations.

It is therefore an object of the present invention to provide a method of characterizing large scale wafer topography critical to device yields.

It is another object of the invention to provide a method of modifying surface topography to more favorable configurations which optimize device characteristics and yield.

According to the invention, a method is provided for determining the large scale topography of wafers by measuring wafer height, relative to a central reference point, at selected radial positions over the surface of the wafer. A shape angle, $\alpha$, and shape magnitude, M, are computed based on these measurements. The $\alpha$ and M values for each wafer are correlated with device performance and yield.

A model predicts the existence of four critical shapes where surface inversions may occur (convex to concave and vice versa) which may result in stress inversions (tensile to compressive and vice versa). Wafers are selected, using the characterization technique, which have unfavorable configurations at any point in the processing. The shape of these wafers is then altered to a favorable configuration before processing is continued. This is accomplished by producing a compensating non-uniform film on the backside of the wafer. This is achieved by the selective removal of the backside films or the addition of films typically used in semiconductor processing. By limiting this reconfiguration processing to the backside, the frontside can be left undisturbed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

A study of wafer surfaces prior to trench isolation shows that wafers with particular profile shapes have a higher incidence of leakage related failures in trench and device structures. These surfaces had been characterized after silicon epitaxy and oxide and nitride films had been grown. Subsequent removal of these nitride and oxide layers from the backside of the wafers using reactive ion etch (RIE) was found to decrease the wave convexity and often to a flat or concave state. Elimination of this backside etch leaves wafers in a more convex state prior to the chemical vapor deposition (CVD) oxide film growth which is used to define trench isolation structures.

Experimental Procedure

Figure 1:
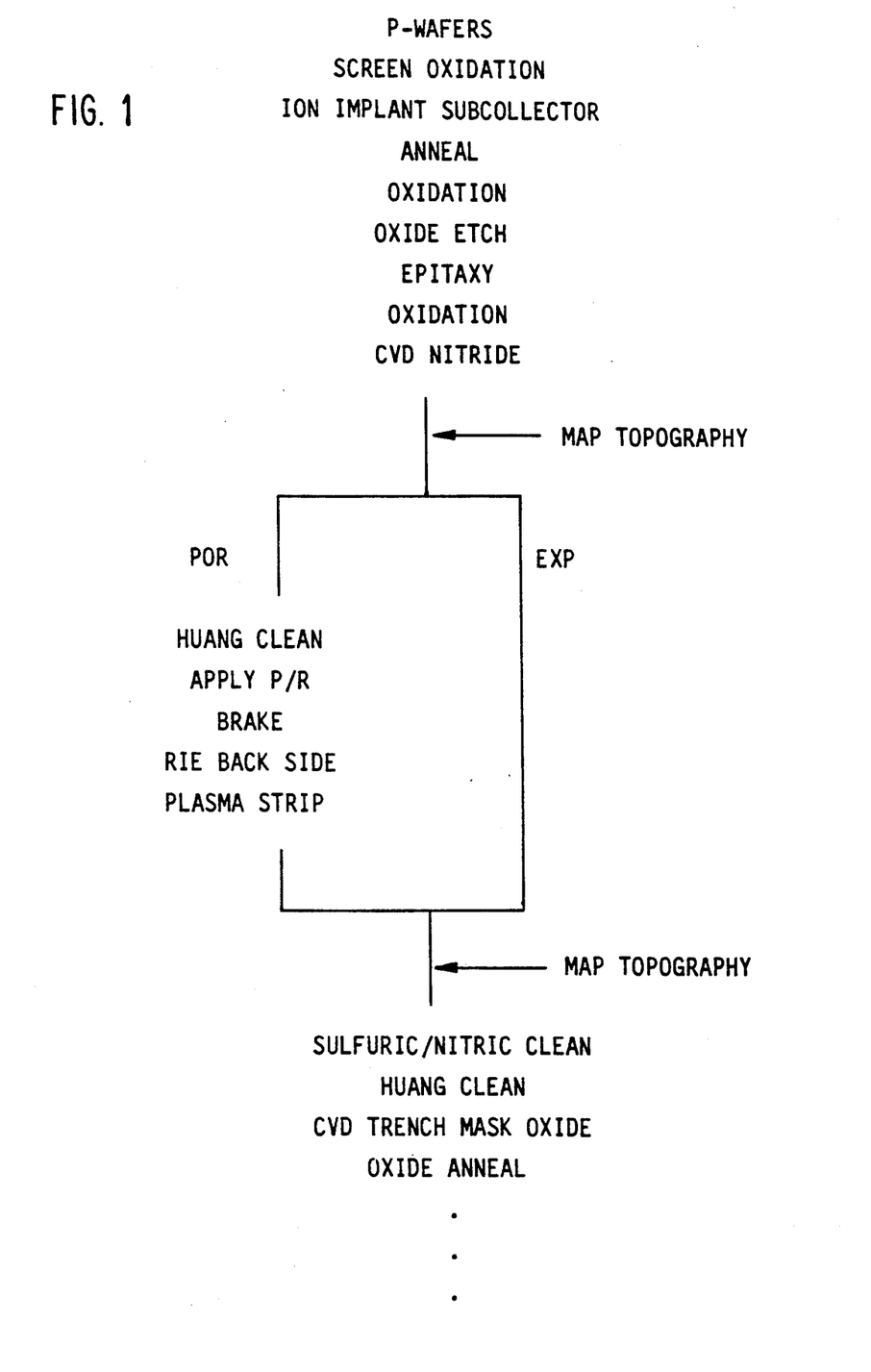
FIG. 1 is a flow diagram showing the front end process of split lot comparison.

Wafers from two product types, referred to herein as product A and product B, with bipolar device structures using polycrystalline silicon filled trench (PST) isolation technology were used to assess the influence of surface topography and the backside etch process prior to trench CVD oxidation. The evaluation utilized six jobs which were split prior to the backside etch process. Half the wafers in each job received the process of record (POR) backside etch while the other experimental half (EXP) were not etched. In one job (product A), the experimental cell (EXP2) received only the frontside photoresist and strip processes. FIG. 1 shows the process details used which compares the elimination of the backside etch with the POR. As shown in FIG. 1, the surface topography, warpage and bow of each wafer were determined before and after the backside etch process and characterized again at the end of the master slice.

Figure 2:
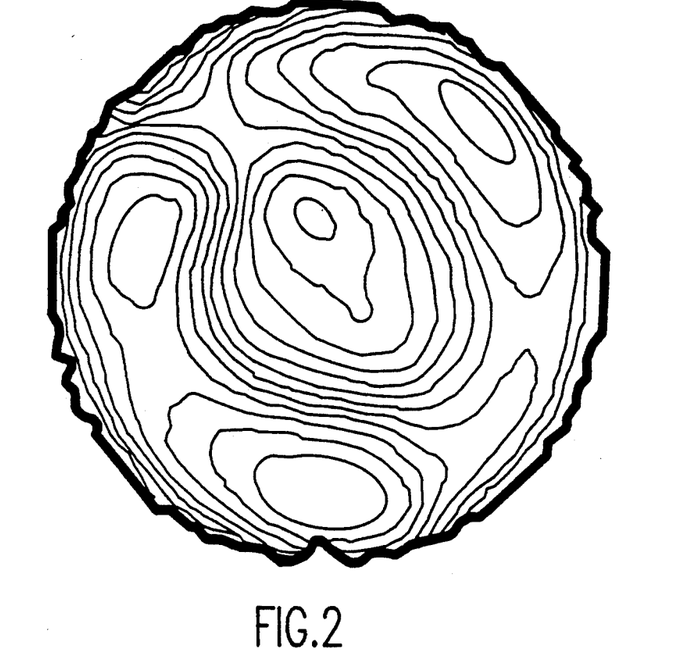
FIG. 2 is a topographic map of the surface of a silicon wafer.
Figure 2A:
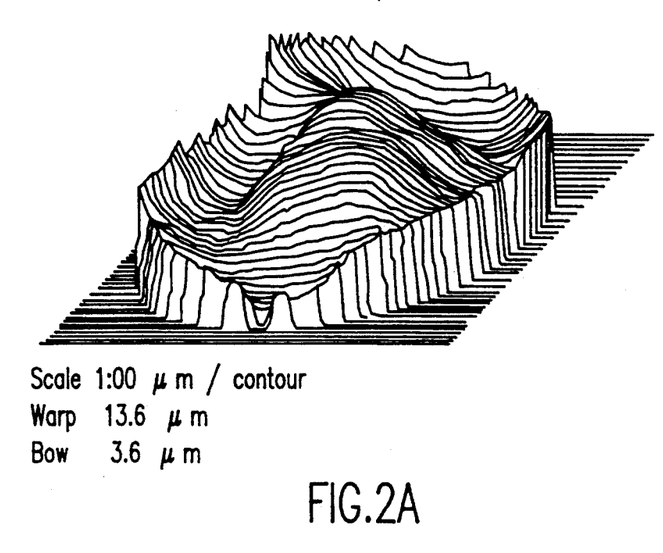
FIG. 2A is a three-dimensional projection of the topographic map.
Figure 3:
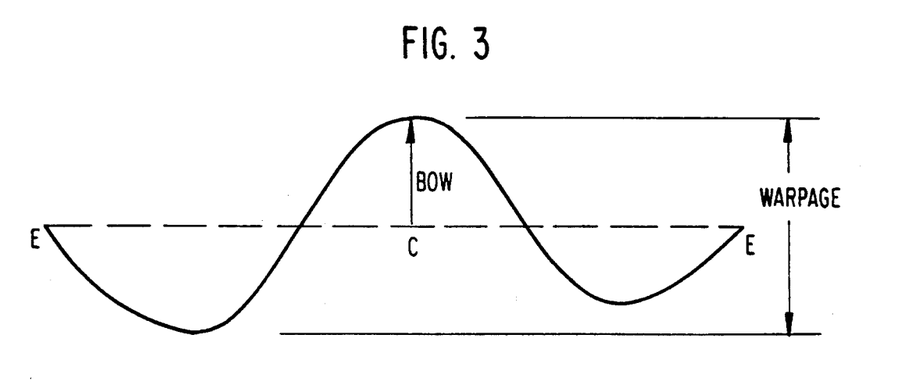
FIG. 3 is a graph illustrating the definition of warpage and bow.

The surface topographies were obtained from an automated interferometer using an optical HeNe laser. The output is a contour map showing elevations. A typical map is shown in FIG. 2 and, as a three-dimensional projection, in FIG. 2A. The characterization zone of such maps excludes $\approx 2$ mm of the wafer edge. The term "wafer edge" as used here refers to the edge of the characterization zone. Within this region, it is useful to describe surface topography in terms of wafer warpage and bow. By convention, warpage is defined as the maximum variation of the wafer surface. It is measured as the difference (always positive) between the highest and lowest elevation without regard to location. Wafer bow is defined as the elevation at the wafer center relative to a reference plane. As used herein, the reference plane is defined at the wafer edge as a best fit surface placing the wafer parallel to a reference prism. Positive bow denotes a generally convex surface and negative bow defines a concave surface. FIG. 3 illustrates both warpage and bow.

Figure 4:
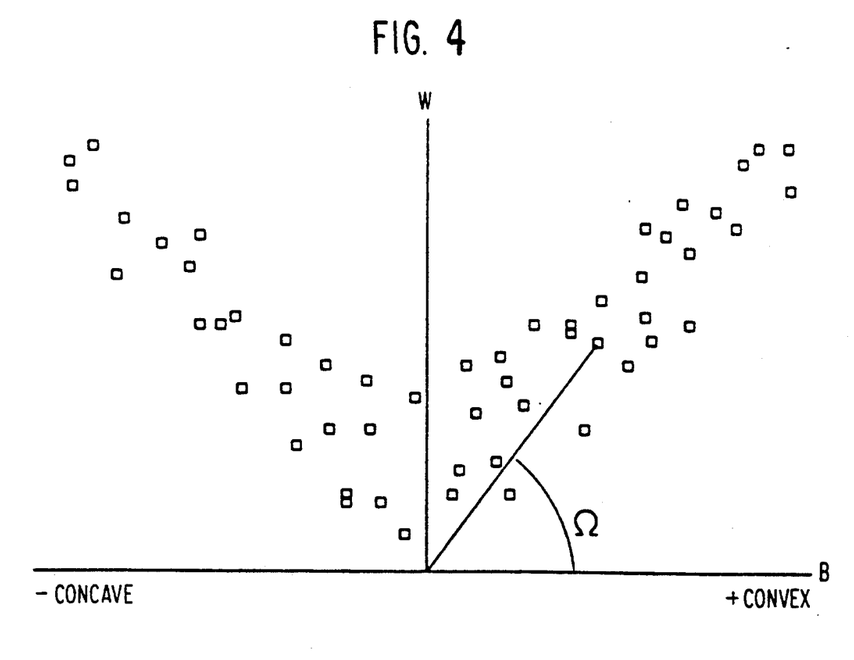
FIG. 4 is a graph showing the dependence of warpage on bow.

Characterizations of surface topography using warpage and bow can be ambiguous as an infinite number of profile shapes would satisfy a particular warpage or bow. If warpage W and bow B are considered together as in a W/B ratio, the vagueness is reduced. If warpage measurements are plotted as a function of bow, a population of wafer data points appears as generally shown in FIG. 4. The W/B ratio can be used to define an angle $$\Omega = \tan^{-1}\left(\frac{W}{B}\right). \quad (1)$$

The usefulness of this measurement is realized when test data is correlated with $\Omega$ which eliminates the complexities of using ratios involving a division by very small numbers or zero. With a few exceptions, wafers with $\Omega$ in the range $90°\pm20°$ are generally those which are close to being almost flat. Where $\Omega$ becomes almost invariant (for large $|B|$), the relationship of W to B is approximately fixed. This generally occurs when wafer surfaces are either everywhere convex or concave. Test data is plotted in FIG. 4 with $\Omega$ to determine the sensitivity to surfaces which are nearly flat. Apart from this, $\Omega$ is not useful in identifying more complex large scale topographies.

Large Scale Topography Model

Figure 5:
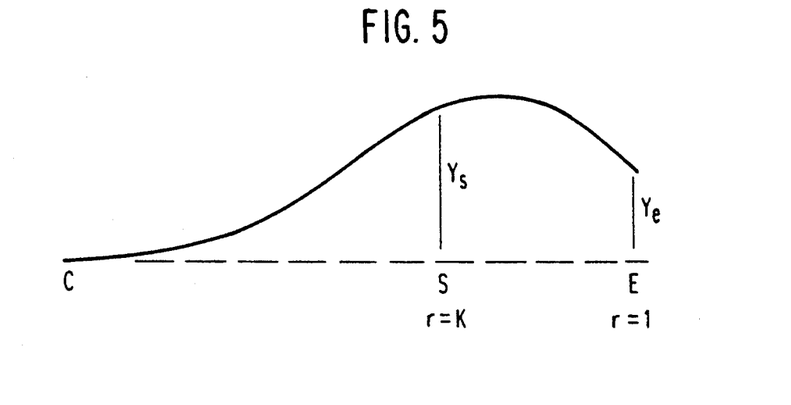
FIG. 5 is a graph showing measurements of relative elevations along a radius at an intermediate site and the edge of a wafer relative to the center.

The task of correlating the main features of each map with device test data is achieved by considering only large scale variations of the wafer surface as the first order effect. In this treatment, small localized variations are neglected for simplicity. In this method, elevations are measured using the center of the wafer as the reference point. Surface elevations are measured using the center of the wafer as the reference point, which is also the origin of a cylindrical $(Y,\theta,r)$ coordinate system. In this notation, Y is the elevation, $\theta$ is the angular displacement, and r is the normalized radius $(\theta \leq r \leq 1)$. From the topographical maps, the average elevation of the wafer edge $(Y_e)$ and at some intermediate position $(Y_s)$ are determined for each radius as illustrated in FIG. 5. In FIG. 5, C denotes the center of the wafer, S an intermediate site and E the edge of the wafer. The average elevation is defined at the edge $(r=1)$ using $$Y_e = \frac{1}{2\pi} \int_0^{2\pi} Y(\theta, 1) d\theta. \quad (2)$$

The average elevation at the intermediate radius $(r=K<1)$ is defined by $$Y_s = \frac{1}{2\pi} \int_0^{2\pi} Y(\theta, K) d\theta. \quad (3)$$

For a sampling system which measures the average elevation ar $r=K,1$ for n equidistant radii (in $\theta$), $$Y_e = \frac{1}{n} \sum_{i=1}^{n} Y(\theta_i, 1), \text{ and} \quad (4)$$

$$Y_s = \frac{1}{n} \sum_{i=1}^{n} Y(\theta_i, K). \quad (5)$$

A minimum of four equally spaced radii are characterized for a wafer. Elevations above the wafer center are positive and those below are negative (i.e., the sense is opposite of bow). These measurements are then used as boundary conditions for an analytical solution expressing the large scale surface topography as a function of distance from the wafer center.

The general solution is derived by solving a linear differential equation with constant coefficients of the form $$\Phi(D)Y=0, \quad (6)$$

where $\Phi(D)$ is the linear polynomial operator in $D=d/dr$ and $r(0 \leq r \leq 1)$ is the normalized distance from the center. The solution is approximated by assuming a power series solution.

$$Y=H_0+H_1r+H_2r^2+H_3r^3+\ldots+H_nr^n, \quad (7)$$

where $$H_1 \ldots H_n = \text{constants}. \tag{8}$$

The initial boundary condition require that $y=0$ at $r=0$. To simplify further, it is assumed that the wafer topography is axially (perpendicular to the surface) symmetric. This requires that $DY/dr=0$ at $r=0$. These considerations require that $$H_0 = H_1 = 0. \tag{9}$$

It should be noted that axial symmetry is assumed only as a simplification of the problem. If the slope is not zero at $r=0$, the term involving r is nonzero which permits a wider range of topographical possibilities.

$$Y = H_2 r^2 + H_3 r^3 \ldots H_n r^n, \tag{10}$$

The two elevations $Y_s$ and $Y_e$, for each radius are determined at $r=K$ (where $K<1$) and $r=1$ (wafer edge), respectively. The intermediate elevations were all made at $K=2/3$. The results from the radii characterized were then averaged to determine the effective value of $Y_s(r=K)$ and $Y_e(r=1)$ for the wafer. These conditions limit the solution to the first two terms of equation (10).

$$Y = ar^2 + br^3, \tag{11}$$

where $$a = H_2 = \frac{Y_s - K^3 Y_e}{K^2(1-K)}, \text{ and} \tag{12}$$

$$b = H_3 = \frac{K^2 Y_e - Y_s}{K^2(1-K)}. \tag{13}$$

Figure 6:
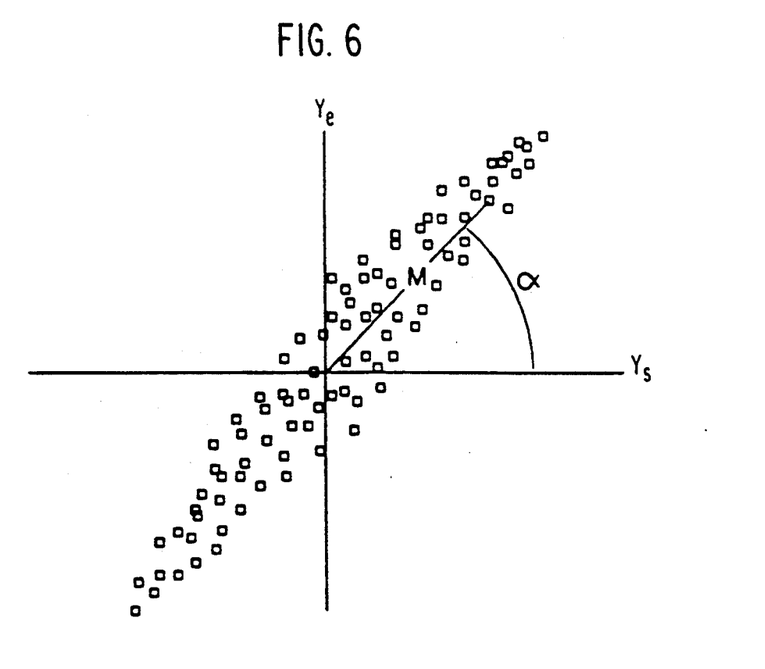
FIG. 6 is a graph showing a map of data points defining the shape angle $\alpha$ and magnitude M.

A map of $Y_e$ versus $Y_s$ for each wafer defines a population of data points. This plot usually appears as an oblong distribution as illustrated in FIG. 6. The relative relationship between these measurements is defined by a shape angle, $\alpha$, and magnitude, M, where $$\alpha = \tan^{-1}\left(\frac{Y_e}{Y_s}\right), \text{ and} \tag{14}$$

$$M = \sqrt{Y_e^2 + Y_s^2}. \tag{15}$$

Using equation (14), the model constants are redefined in terms of $Y_s$ and $\alpha$ as follows:

$$a = Y_s\left[\frac{1 - K^3 \tan\alpha}{K^2(1-K)}\right], \text{ and} \tag{16}$$

$$b = -Y_s\left[\frac{1 - K^2 \tan\alpha}{K^2(1-K)}\right]. \tag{17}$$

The model constants for each wafer are also mapped. The relative relationship of the model constants are defined by a model constant angle $\beta$ where $$\beta = \tan^{-1}\left(\frac{b}{a}\right) = \tan - 1\left(\frac{K^2 \tan\alpha - 1}{1 - K^3 \tan\alpha}\right). \tag{18}$$

Figure 7:
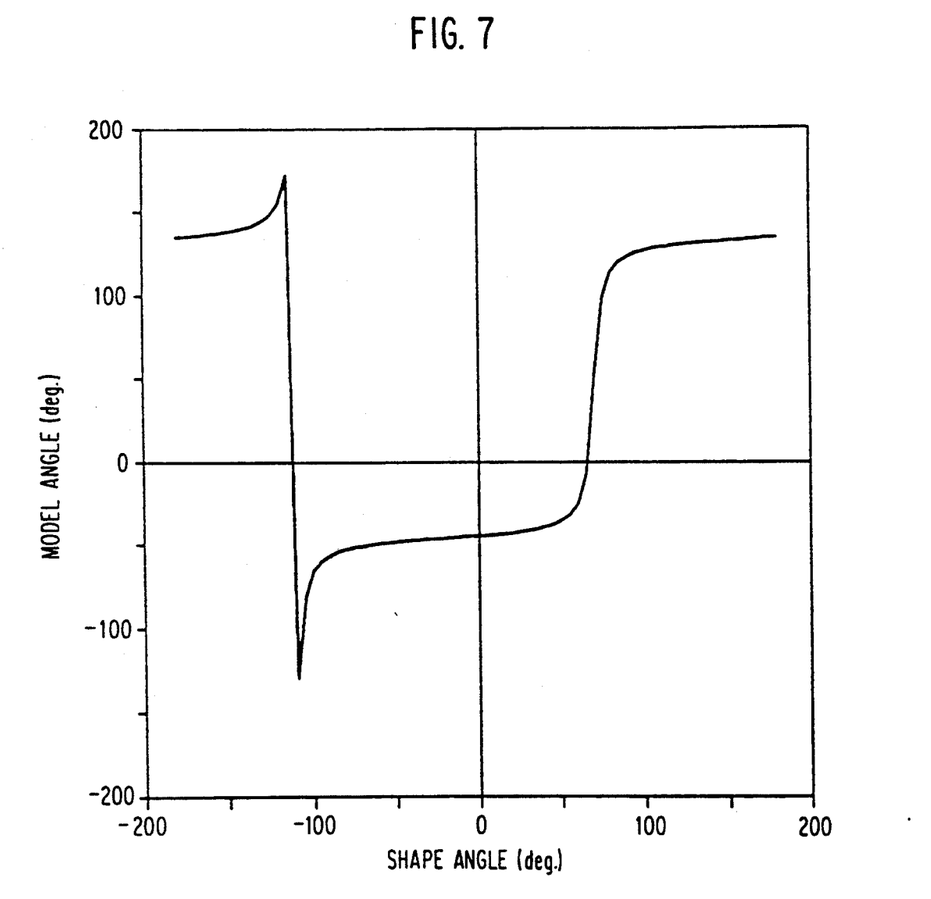
FIG. 7 is a graph showing the theoretical model angle $\beta$ versus shape angle $\alpha$.

Using equation (18), the dependence of $\beta$ on $\alpha$ is shown in FIG. 7. As can be seen, there are regions of the plot where $\alpha$ and $\beta$ are almost exclusively invariant. In correlating test data to either $\alpha$ or $\beta$, there is sensitivity to small changes in either $\alpha$ or $\beta$ in these regions of quasi invariance. It is therefore useful to correlate test data to both $\alpha$ and $\beta$ which intersect the regions of FIG. 7 critical to test data.

Using the techniques described, the large scale surface topography is completely defined by $\alpha$ and the extent of complex bowing by M. Some additional fundamental definitions can also be made involving these terms. Surfaces are defined as proportionally similar if their $\alpha$ angles are identical although the values of M may be dissimilar. If the values of $\alpha$ are different, the surfaces are proportionally dissimilar. Simple topographies are defined as surfaces which are everywhere either convex or concave and usually occur within narrow ranges of $\alpha$. It is generally observed that wafer surfaces with a large M (and large W/B ratios) will have topographies which are simple. A flat wafer is obtained in the limit as M→0 for any shape angle.

Figure 8:
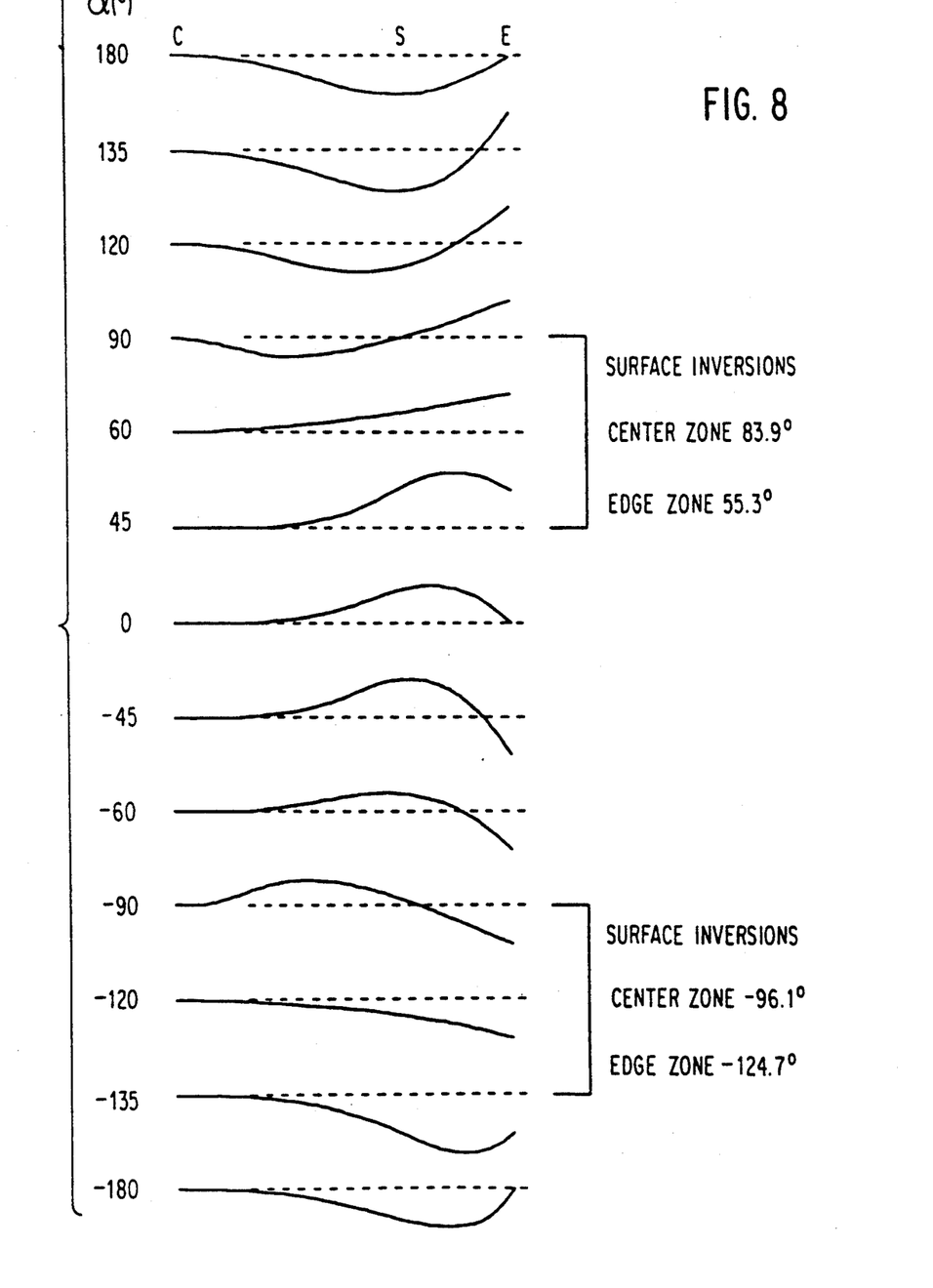
FIG. 8 is a family of graphs illustrating radial profiles of selected axially symmetric topographies.

Topographies at various values of $\alpha$ in the range of from $-180°$ to $+180°$ are illustrated in FIG. 8. In these graphs, surface inversions (from convex to concave and vice versa) are noted in regions which correspond to the corners shown in FIG. 7. The critical values of $\alpha$ at which these surface inversions occur can be determined by solving for the roots of $d\beta/d\alpha = 1$. The roots obtained are functionally dependent on the value of K. The two positive critical angles (roots) lie on a set of two bifurcated branch functions which converge at $K=0$ and $K=1$. A set of similar branches account for the two negative critical angles with the same points of convergence. A sufficient angular spacing (e.g., $>20°$) between the bifurcated roots of each set is obtained for $0.3<K<0.85$. Within this range, the maximum root separation in each set is almost 29° and occurs at $K=0.6$ which is near the value used in the surface characterizations. For $K=0,1$, the critical shape angles approach simple surface topographies which limits the usefulness of the method in identifying potential surface inversion states. Using $K=2/3$ was found to be convenient in characterizing a large number of wafer surfaces. For this value of K, the area of the inner circle is approximately equal to the annular region. This also gave a reasonable angular separation of the roots so that the influence of each critical shape angle on test data could be determined.

If $\alpha$ is close to one of these critical values, a wafer may undergo a surface inversion resulting from process induced changes in $\alpha$. These perturbations may arise during thermal processes or from processes which introduce mechanically applied stresses. These transitional surface instabilities can cause stress inversions (compressive←→tensile) in silicon which may be localized near patterned structures.

Results

Topography prior to Deep Trench Isolation:

The backside nitride etch process prior to the deep trench CVD oxidation generally reduced wafer convexity by 5 to 15 μm in the bow measurements. As a result, many of these POR wafers were nearly flat or in a concave state which could introduce corresponding compressive stress effects, particularly near trench and device regions. The elimination of this process left the bow of EXP wafers in a more convex state (10 to 30

μm) on both product types. Bow measurements of EXP2 wafers indicated that photoresist related processes (without RIE) reduced convexity slightly by 2 to 3 μm. This shift in bow is attributed to the plasma etching of the photoresist film. Also, the shape and mode angles of the EXP2 wafers were uniquely different from EXP wafers in that these angles were shifted towards one of the inversion zones.

Figure 9:
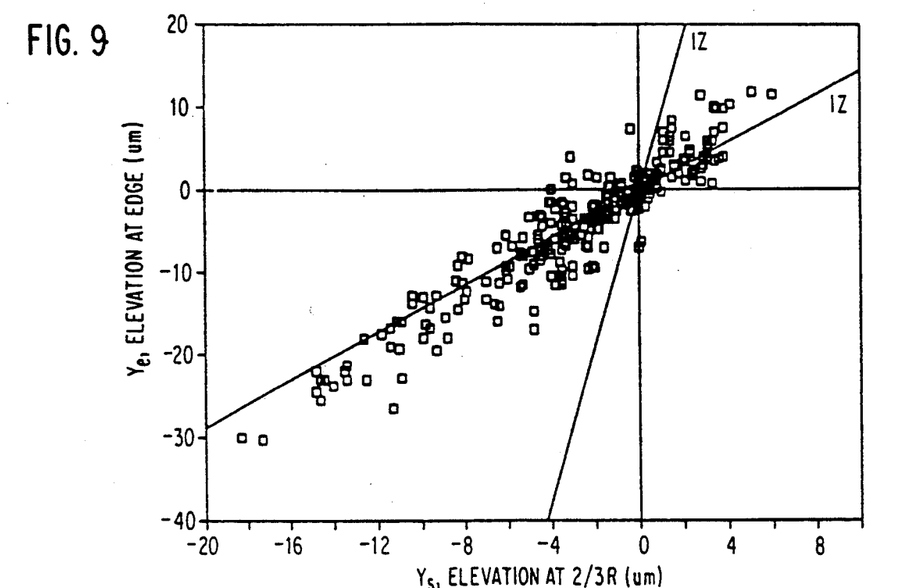
FIG. 9 is a graph showing population ($Y_s$, $Y_e$) data prior to trench CVD oxidation.
Figure 10:
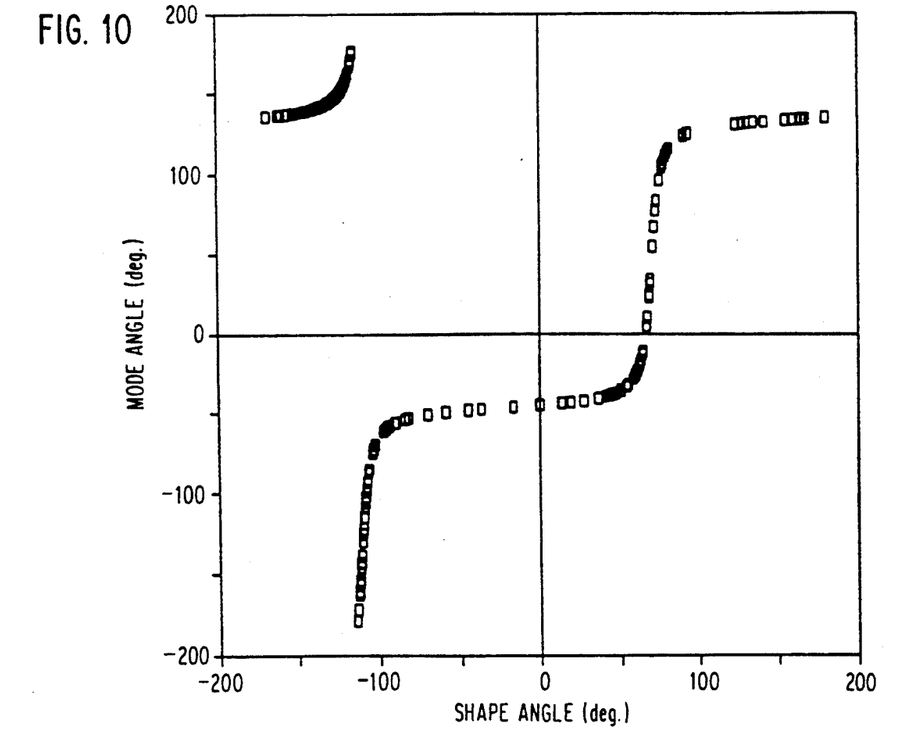
FIG. 10 is a graph showing model angle, $\beta$, versus shape angle $\alpha$ illustrating the distribution of data points prior to trench CVD oxidation.

The map of $Y_e$ versus $Y_s$ in FIG. 9 shows the oblong distribution of data points for the wafers along the critical inversion zones (IZ) as a reference. In FIG. 9, the left data points are surfaces which are generally convex while the right data points are generally concave. Using the $Y_s$ axis as a reference, this population is shown to be angularly displaced by $\approx 10°$ from the expected optimum (i.e., $\alpha \approx 70°$) which causes a larger overlap of one of the critical zones (IZ lines). The distribution also shows that an almost full spectrum of shapes exist at smaller values of M. As M increases, the range of $\alpha$ eventually becomes limited to those values associated with simple topographies. This indicates that the shape angle is dependent on M and wafer bow. Using equations (16), (17) and (18), the model constants (a,b) and the model angle, $\beta$, were then calculated for each wafer. The plot of $\beta$ versus $\alpha$ in FIG. 10 shows a distribution which populates almost the entire range shown in the theoretical curve of FIG. 7. Data points located near the corners of FIG. 10 correspond to points near the IZ lines in FIG. 9.

Figure 11:
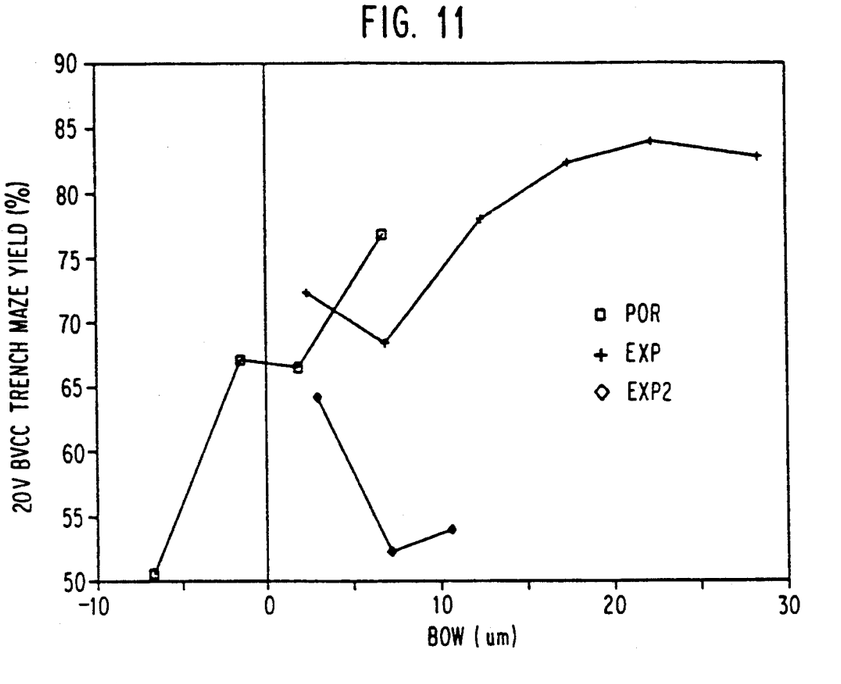
FIG. 11 is a graph showing the dependence of isolation maze BVcc LLY on wafer bow prior to trench CVD oxidation.

BVcc Trench Maze Test:

Test results from a maze consisting of parallel isolation trench structures indicates that the EXP wafers had fewer wafers with low yield due to BVcc leakage. A correlation with bow and M prior to the trench CVD oxide shows that the 20 volt BVcc yield decreases with a reduction in convexity of both POR and EXP wafers. FIG. 11 shows that the higher yield obtained with the EXP wafers from product A could be attributed to a larger population of convex wafers. However, EXP2 wafers had a lower yield than either EXP or POR wafers which can be attributed to a larger population of wafers with surface topographies near inversion zone states.

Figure 12:
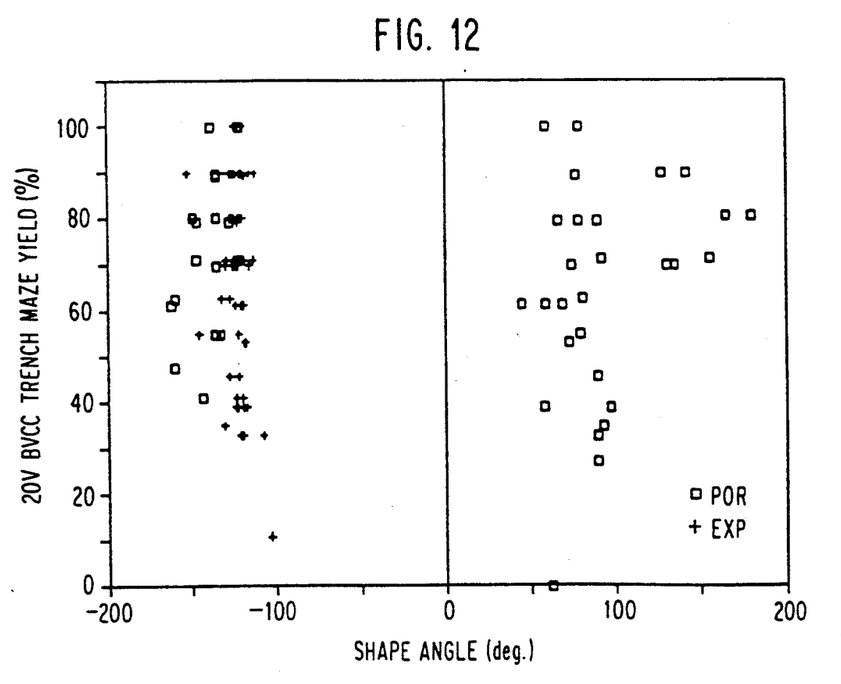
FIG. 12 is a graph showing the dependence of isolation maze LLY on shape angel, $\alpha$, prior to trench CVD oxidation.
Figure 13:
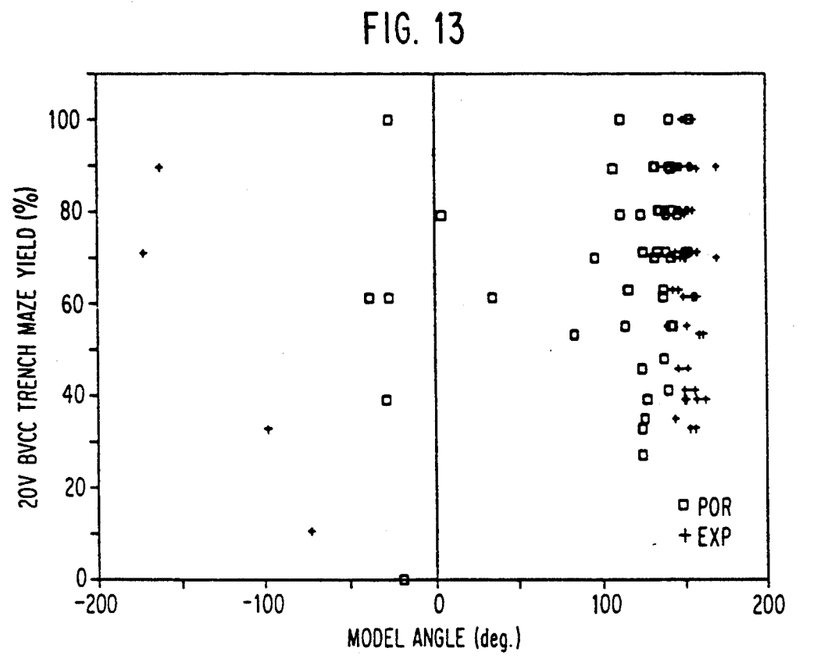
FIG. 13 is a graph showing the dependence of isolation maze LLY on modeangle, $\beta$, prior to trench CVD oxidation.

A correlation with shape and model angles indicates that the maze yield of all wafers is influenced by the proximity of the wafer surfaces to critical inversion zone angles shown in FIGS. 12 and 13, respectively. In FIG. 12, the BVcc LLY is plotted as a function of the shape angle which was measured prior to the trench mask oxide process. The entire range of shape angles is not represented as these measurements were limited to only product A. However, this plot does show some indication that the isolation LLY is lowered by the proximity of wafer surfaces to critical shape angles. Critical shape angles occur at $-124.7°$, $-96.1°$, $+55.3°$, and $+83.9°$. In a similar plot, FIG. 13 shows the same LLY data base as a function of the model angle also measured prior to the trench mask CVD oxide. This plot shows lower yields for those wafer surfaces which are near critical model angles at $-60.7°$, $-32.1°$, $+119.3°$, and $+147.9°$. The coincident lower LLY levels near the critical shape and model angles are associated with the surface inversion zones which correspond to the corners shown in FIG. 7.

End of Master Slice Bow:

Measurements at post Pt test indicated that all wafers had simple convex topographies with no significant differences between EXP or POR wafers within a particular product type. However, product B wafers were significantly less convex (3 to 7 μm) than product A wafers (12 to 25 μm). As the two product types have similar processes, this difference is attributed to differences in the density of trench isolation structures.

Post Pt Test:

Discrete transistor structures in the kerf were tested after the master slice processes to assess transistor LLY. In this test, the collector to base break down voltage (BVcbo) with the emitter open was measured at 10 μA on fifty sites per wafer. These results show that the BVcbo LLY levels were generally improved with the EXP wafers. However, in contrast to the low isolation maze LLY, the EXP2 wafers had a slightly higher BVcbo yield than POR wafers in the same job. Correlations with shape and model angles prior to trench CVD oxidation shows that the BVcbo LLY of all wafers, regardless of product type, were influenced by surface inversions as shown in FIGS. 14 and 15.

Figure 14:
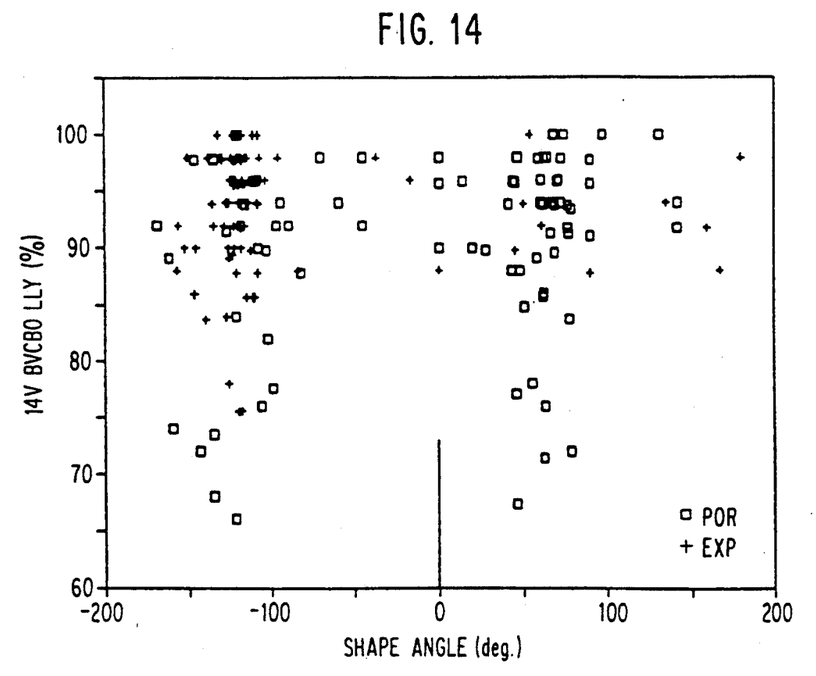
FIG. 14 is a graph showing the dependence of BVcbo LLY on shape angle, $\alpha$, prior to trench CVD oxidation.
Figure 15:
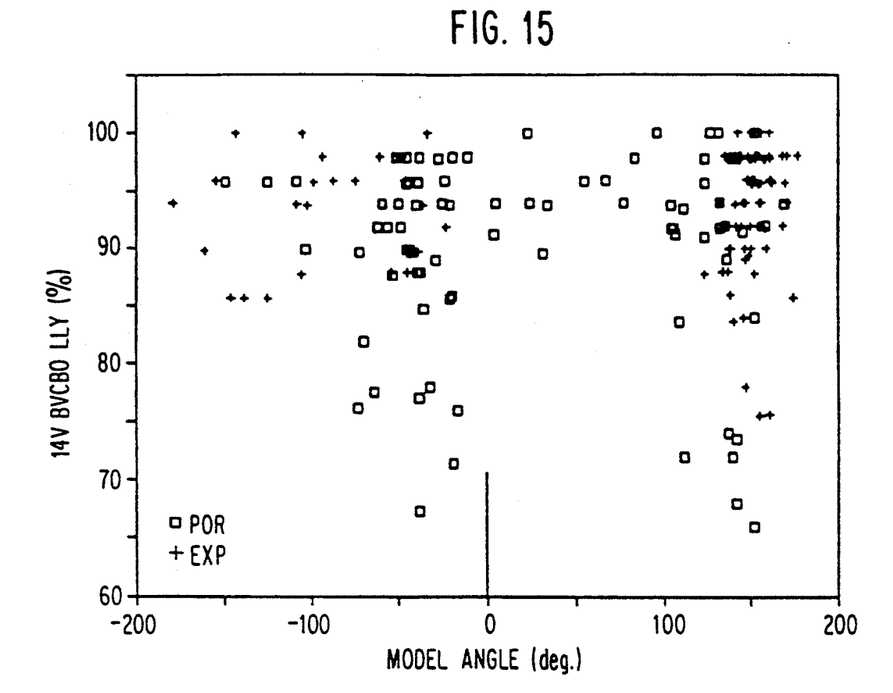
FIG. 15 is a graph showing the dependence of BVcbo LLY on model angle, $\beta$, prior to trench CVD oxidation.

In FIG. 14, the BVcbo LLY for both product types is plotted as a function of the shape angle measured prior to the trench mask CVD oxide process. The large data base in this plot shows clearly that the yield is lowered by the proximity of wafer surfaces near the critical shape angles at $-124.7°$, $-96.1°$, $+55.3°$, and $+83.9°$. Lower LLY levels are also evident for wafer surfaces near the critical model angles at $-60.7°$, $-32.1°$, $+199.3°$, and $+147.9°$, as shown in FIG. 15. The coincident behavior of the LLY levels near the critical shape and model angles indicates that the junction leakage of discrete device structures is associated with the surface inversion zones characterized prior to the fabrication of the isolation structures.

Figure 16:
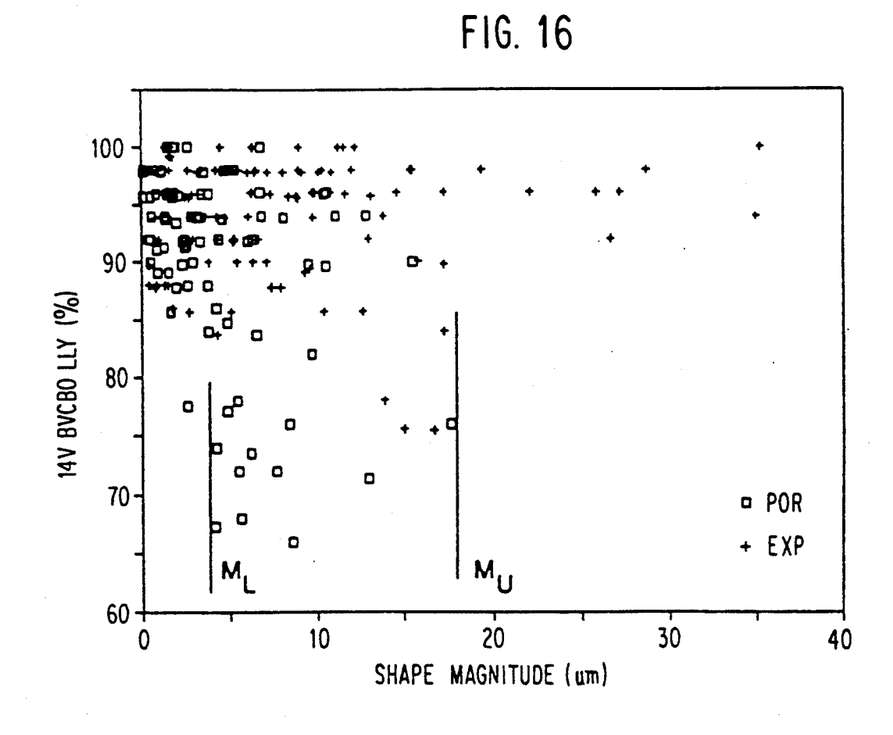
FIG. 16 is a graph showing BVcbo LLY versus shape magnitude, M, prior to trench CVD oxidation.

FIG. 16 shows that BVcbo LLY is conditionally dependent on the degree of convex bowing. For wafers with $M < M_L \approx 4$ μm, the yield is improved and apparently insensitive to the surface inversion phenomena. This threshold may be due to the lower stress limit required to generate defects. For larger values of M, BVcbo yield is statistically reduced as the effects of the surface inversions become apparent. For $M > M_U \approx 18$ μm, BVcbo yield is improved. This is attributed to a decreasing population of wafers occupying inversion zone states as M is increased further.

Figure 17:
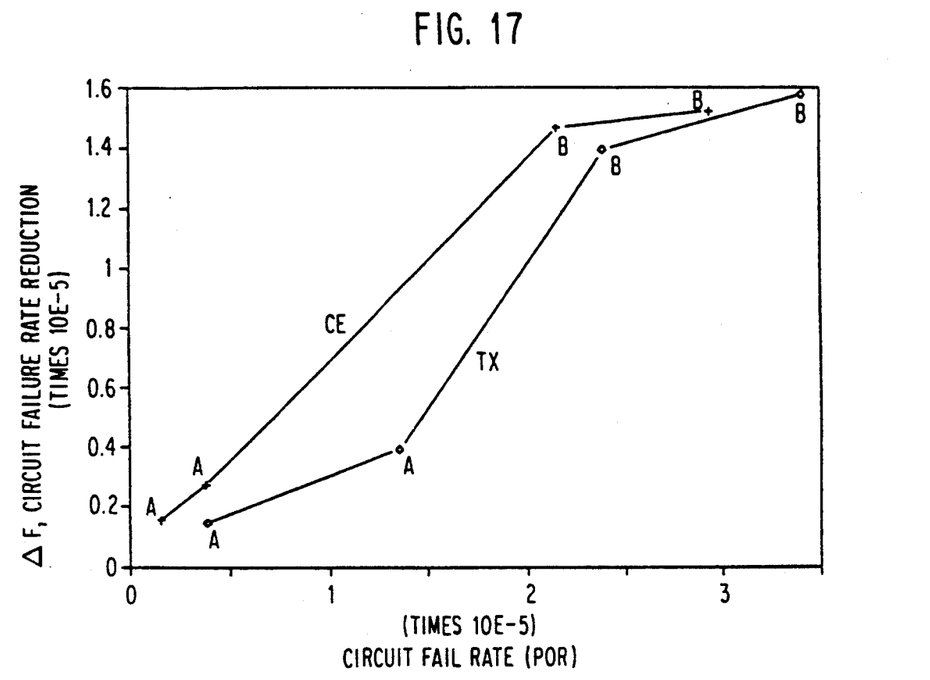
FIG. 17 is a graph showing change in circuit failure rate due to EXP wafers versus failure rate for POR wafers for products A and B.

Transistor Test Chains:

Device chains consisting of parallel transistor circuit cells using $1.5 \times 2$ μm emitters were tested using a sample of twelve sites per wafer. In this test, the junction leakage parameters of trench (TR) isolation structures and transistor (TX) structures were analyzed as exclusive categories. For both product types, the TR LLY results generally indicated that the EXP wafers were comparable to those for the POR cell as only slight improvements were noted. Larger improvements were found in the TX LLY in which the major TX failure mechanism was collector to emitter (CE) leakage in both product types. The average circuit failure rate (F) for each chain and product type was determined from the LLY(Y) using $$Y = (1-F)^N, \tag{19}$$

where N is the number of circuits per chain. FIG. 17 is a plot of the change in circuit failure rate due to EXP wafers $(\Delta F = F_{por} - F_{exp})$ versus failure rate of POR wafers $(F_{por})$ for products A and B. FIG. 17 shows that the CE and TX failure rate of EXP wafers $(F_{exp})$ is reduced and is dependent on failure rate level of the POR wafers ($F_{por}$). Thus, wafers with favorable surface topographies prior to the trench process can improve yield by moderating large variations in LLY.

Figure 18:
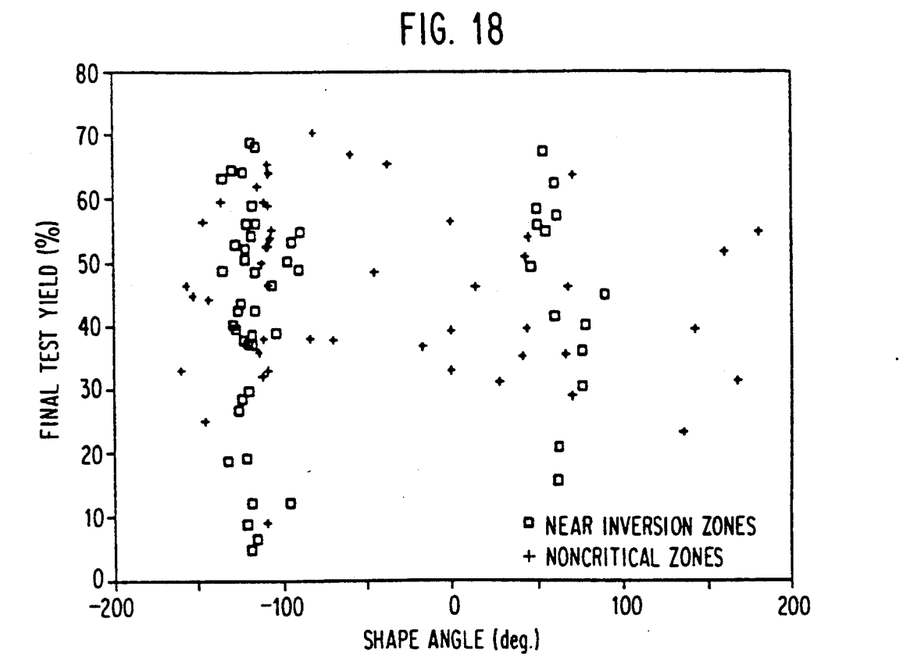
FIG. 18 is a graph showing the dependence of final test chip yield on wafer shape angle prior to trench CVD oxidation.

Final Test:

Final test yields from both product types plotted as a function shape angle measured prior to trench CVD oxidation are shown in FIG. 18. In this figure, wafers have been sorted by their proximity ($\pm 10°$) to critical shape angles. In comparison to wafers in noncritical zones, wafers near the inversion zones have a tendency to have reduced chip yields.

Figure 19:
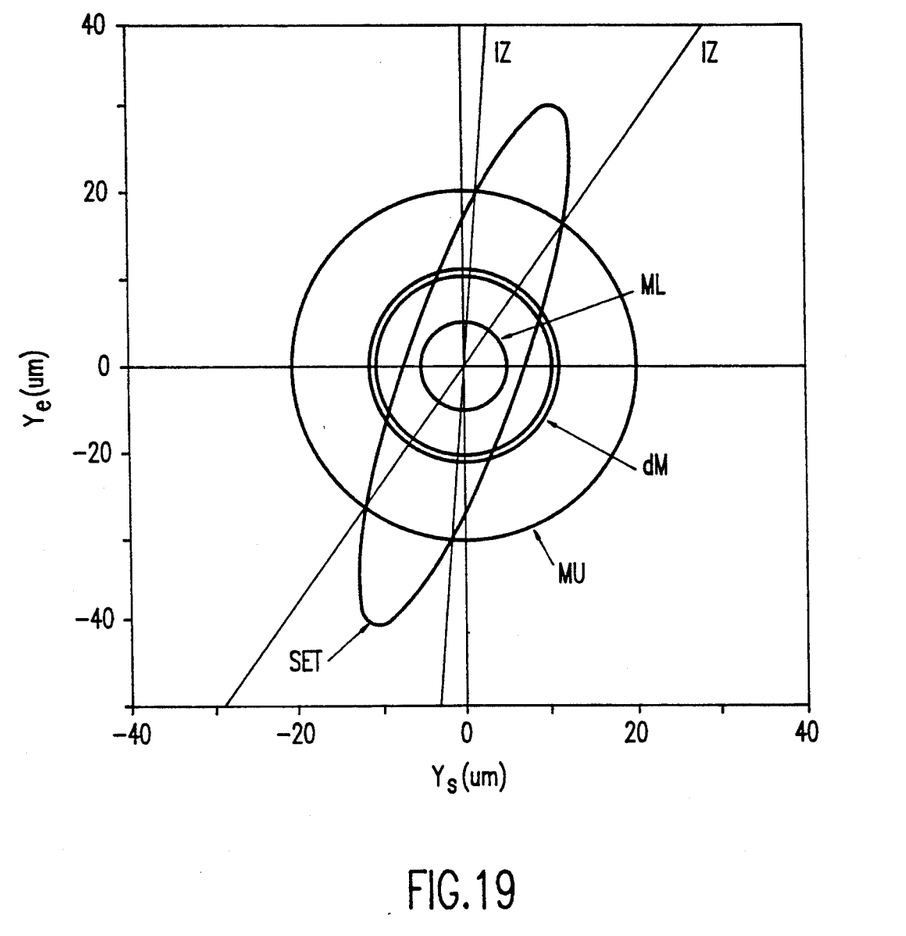
FIG. 19 is a graph showing the relationship of an arbitrary set of points to critical shape angles corresponding to surface inversion zones.

Phenomenological Model:

These results can be described by the phenomenological model in FIG. 19. In this illustration, the relationship of an arbitrary set of data points ($Y_s$, $Y_e$) to the critical inversion zone (IZ) angles is shown. Given any M as indicated, a population of wafers can be found which belong to regions which are in proximity to the inversion zones. Region dM at M contains a subset of points (wafers) in proximity to IZ lines, as shown. LLY improves for $M<M_L$ due to stress threshold effect. LLY reduced for $M_L<M<M_U$ due to surface inversions. Decreasing the subset of points near IZ for $M>M_U$ improves yield. $M_U$ is varied by small rotations of set ($Y_s$, $Y_e$) around the origin. $M_U$ is minimum for a narrow set and centering between IZ regions.

Leakage limited yield results obtained from the trench maze isolation and from discrete kerf transistor structures both indicate that $M_U$ is approximately 18 $\mu$m. While the LLY results obtained from the discrete transistor indicates that $M_L$ is approximately 4 $\mu$m, isolation maze results show that $M_L<0$. This difference indicates that wafers which are nearly flat will result in low trench maze yields which is believed to be caused by a sensitivity to unrelieved stresses localized at isolation structures in the silicon.

Elements of Invention:

The characterization of large scale wafer topography as described above is applied to improving device characteristics and yields in the manufacture of large scale integrated (LSI) devices. First, the heights at the center, the edge and an intermediate point are measured on four or more, and preferably eight, equally spaced radii. This provides, for example, eight values each for $Y_s$ and $Y_e$ which are averaged. Then the shape of angle $\alpha$ is computed using the following equation:

$$\alpha = \tan^{-1}\left(\frac{Y_{eavg}}{Y_{savg}}\right). \quad (20)$$

The shape magnitude M is also computed using the following equation:

$$M = \sqrt{Y_e^2 + Y_s^2}. \quad (21)$$

The thus computed values of $\alpha$ and M are correlated with individual wafer characteristics as to device performance and yield. Based on these results, the wafer processing is controlled to provide optimal wafer characteristics.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of characterization of large scale wafer topography in the manufacture of large scale integrated semiconductor devices comprising the steps of:

measuring the heights at the center, the edge and an intermediate point on a plurality of radii on the wafer to obtain a plurality of values each for $Y_s$, the height of the intermediate point relative to the center, and $Y_e$, the height of the edge relative to the center;

averaging the plurality of values $Y_s$ and $Y_e$;

computing a shape angle $\alpha$ using the following equation:

$$\alpha = \tan^{-1}\left(\frac{Y_{eavg}}{Y_{savg}}\right);$$

computing a shape magnitude M using the following equation:

$$M = \sqrt{Y_e^2 + Y_s^2};$$

correlating the computed values of $\alpha$ and M with individual wafer characteristics as to device performance and yield at intermediate steps in the process; and controlling wafer processing by correlating $\alpha$ and M with individual wafer characteristics to provide optimal wafer yield and leakage characteristics.

2. The method recited in claim 1 wherein measurements are taken along at least four equally spaced radii over the surface of the wafer.

3. A method of correlating semiconductor wafer large scale topography to wafer yield and device characteristics comprising the steps of:

measuring, for a selected surface of the wafer, wafer height at selected radial points on the wafer;

developing at least two measurement indicative of the wafer large scale topography as a function of measured heights; and correlating these at least two measurements indicative of wafer large scale topography to the yield at intermediate steps in the process and/or operating characteristics of devices formed on the wafer.

4. The method recited in claim 3 further including the step of controlling the large scale topography using the correlated measurements of subsequently formed wafers to provide the large scale topographic measurements which optimize selected device parameters and/or yield.

5. The method recited in claim 4 wherein said radial points include an edge point and an intermediate point on a plurality of radial lines, heights at said edge points and said intermediate points being relative to the center of the wafer.

6. The method recited in claim 5 wherein said step of developing at least two measurements comprise the steps of:

averaging the measured edge point heights and the measured intermediate point heights;

determining an angle, $\alpha$, the arctangent of which is the ratio of the average edge point height to the average intermediate point height; and determining a shape magnitude, M, as the squareroot of the sum of the squares of the average edge point height and the average intermediate point height.

* * * * *